United States Patent
Yamanaka et al.

(10) Patent No.: US 7,294,299 B2
(45) Date of Patent: Nov. 13, 2007

(54) GRANULATING DIE, GRANULATION DEVICE AND METHOD OF MANUFACTURING EXPANDABLE THERMOPLASTIC RESIN GRANULES

(75) Inventors: Hideo Yamanaka, Tokyo (JP); Shigeru Takeuchi, Koga (JP)

(73) Assignee: Sekisui Plastics Co., Ltd., Osaka (JP)

( * ) Notice: Subject to any disclaimer, the term of this patent is extended or adjusted under 35 U.S.C. 154(b) by 0 days.

(21) Appl. No.: 10/548,381

(22) PCT Filed: Mar. 11, 2004

(86) PCT No.: PCT/JP2004/003205

§ 371 (c)(1),
(2), (4) Date: Sep. 8, 2005

(87) PCT Pub. No.: WO2004/080678

PCT Pub. Date: Sep. 23, 2004

(65) Prior Publication Data

US 2006/0204604 A1    Sep. 14, 2006

(30) Foreign Application Priority Data

Mar. 12, 2003 (JP) .............................. 2003-067016

(51) Int. Cl.
*B29B 9/10* (2006.01)
(52) U.S. Cl. .................. 264/142; 425/67; 425/313
(58) Field of Classification Search ............... 425/311, 425/313, 67; 264/142
See application file for complete search history.

(56) References Cited

U.S. PATENT DOCUMENTS

| 3,867,082 A | 2/1975 | Lambertus |
| 5,763,498 A * | 6/1998 | Knaus ......................... 521/60 |
| 6,592,350 B1 * | 7/2003 | Chszaniecki ................. 425/67 |

FOREIGN PATENT DOCUMENTS

| JP | 48-20423 | 6/1973 |
| JP | 49-69775 A | 7/1974 |
| JP | 61-195808 | 8/1986 |
| JP | 6-31726 A | 2/1994 |
| JP | 6-136176 A | 5/1994 |

(Continued)

OTHER PUBLICATIONS

International Search Report, Sep. 8, 2005.

*Primary Examiner*—Robert Davis
*Assistant Examiner*—Marissa W Chaet
(74) *Attorney, Agent, or Firm*—Rader, Fishman & Grauer PLLC (57) ABSTRACT

A granulating die B is provided with a resin discharge surface 5a to which a flow of water is contacted; and a plurality of nozzles 8 which communicate to a cylinder of an extruder are provided in this resin discharge surface 5a. Upon the resin discharge surface 5a, these nozzles 8 are not formed in at least one of its regions P which are in the direction of inflow of the flow of water and in the direction of outflow of the flow of water, and its regions R which are in directions orthogonal to this direction of inflow of said flow of water and this direction of outflow of said flow of water, but are only formed in the other regions Q thereof.

10 Claims, 6 Drawing Sheets

FOREIGN PATENT DOCUMENTS

| | | |
|---|---|---|
| JP | 7-178726 A | 7/1995 |
| JP | 7-314438 | 12/1995 |
| JP | 9-208735 | 8/1997 |
| JP | 11-058374 | 3/1999 |
| JP | 11-277528 A | 10/1999 |
| JP | 2001-253965 | 9/2001 |
| JP | 2002-337138 | 11/2002 |
| WO | WO 2005/028173 | 9/2004 |

* cited by examiner

GRANULATING DIE, GRANULATION DEVICE AND METHOD OF MANUFACTURING EXPANDABLE THERMOPLASTIC RESIN GRANULES

TECHNICAL FIELD

The present invention relates to a granulating die and to a granulation device for forming granules of a thermoplastic resin by the hot cut method; and, in particular, relates to such a granulating die and to such a granulation device which are capable of producing granules of a uniform granule diameter at good efficiency while avoiding nozzle clogging. Moreover, the present invention also relates to a method of manufacturing expandable thermoplastic resin granules using the die.

Priority is claimed on Japanese Patent Application No. 2003-67016, the content of which is hereby incorporated herein by reference.

BACKGROUND ART OF THE INVENTION

A device for forming pellets of thermoplastic resin is well known from the past, and, generally, such a device has an extruder, a die which is fitted to the end of this extruder, and a cutter; a resin material which has been melted and mulled is extruded from the die by the extruder, and is cut by the cutter, thus manufacturing pellets of the desired size. As methods for cutting the resin material which is extruded from the nozzle of the die, there are known the cold cut method and the hot cut method. The cold cut method is a method in which the resin material which has been extruded from the nozzle of the die is conducted to a water tank and is cooled, and is cut up after having thus been formed into the shape of strands. On the other hand, the hot cut method is a method in which the end face of a die in which a plurality of nozzles are opened is contacted with a flow of water, and the high temperature resin is cut with the cutter directly after having been extruded in the flow of water.

In granulation by the hot cut method, since the resin is cut while in the state of not yet having fully hardened, accordingly there is no powdering of the resin, which is the disadvantage of the cold cut method. Furthermore, with granulation by the hot cut method, there are the beneficial aspects that it is possible to obtain spherical granules, and so on.

Figure 4:
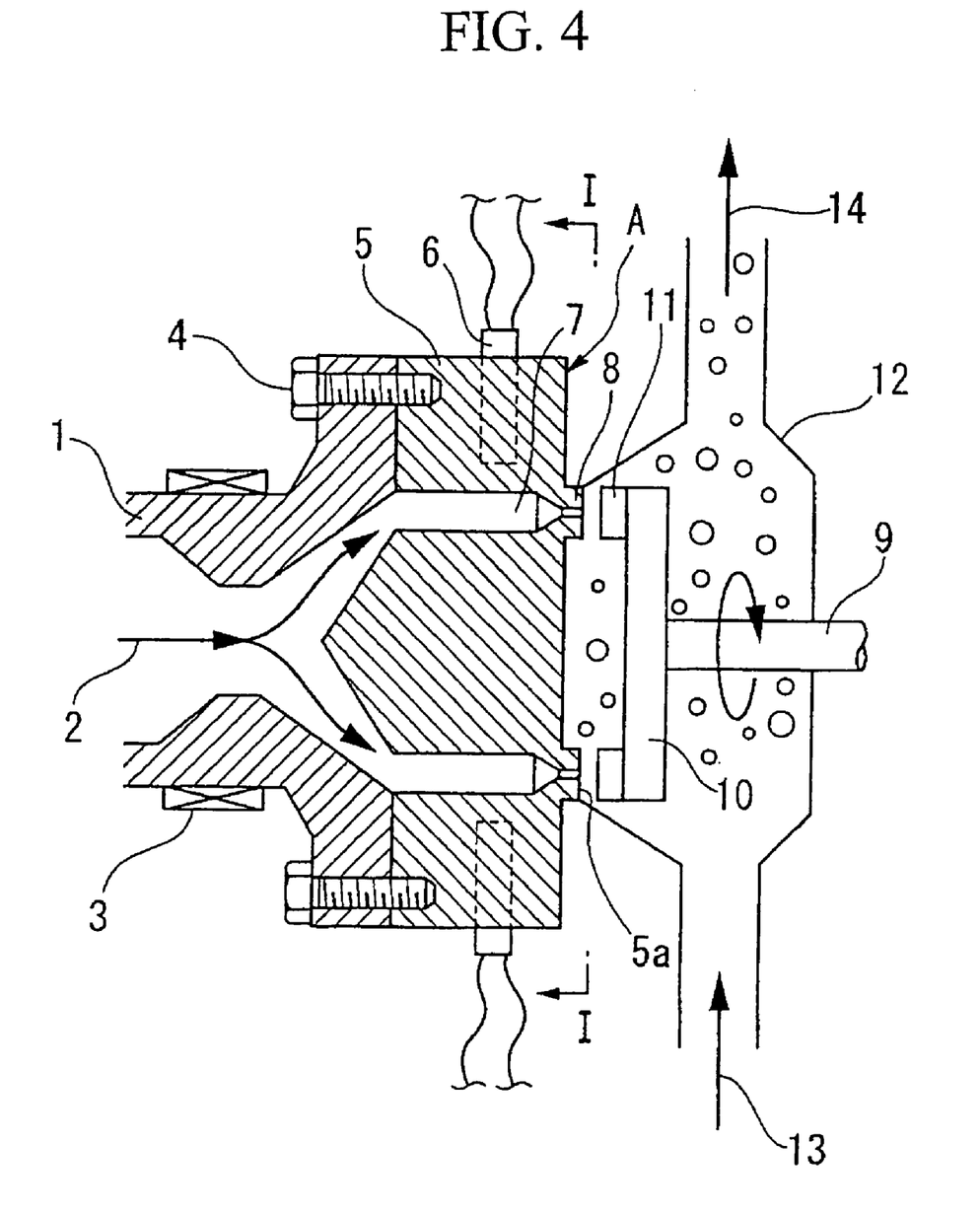
FIG. 4 is a sectional view showing an embodiment of the granulating die according to the present invention.
Figure 5:
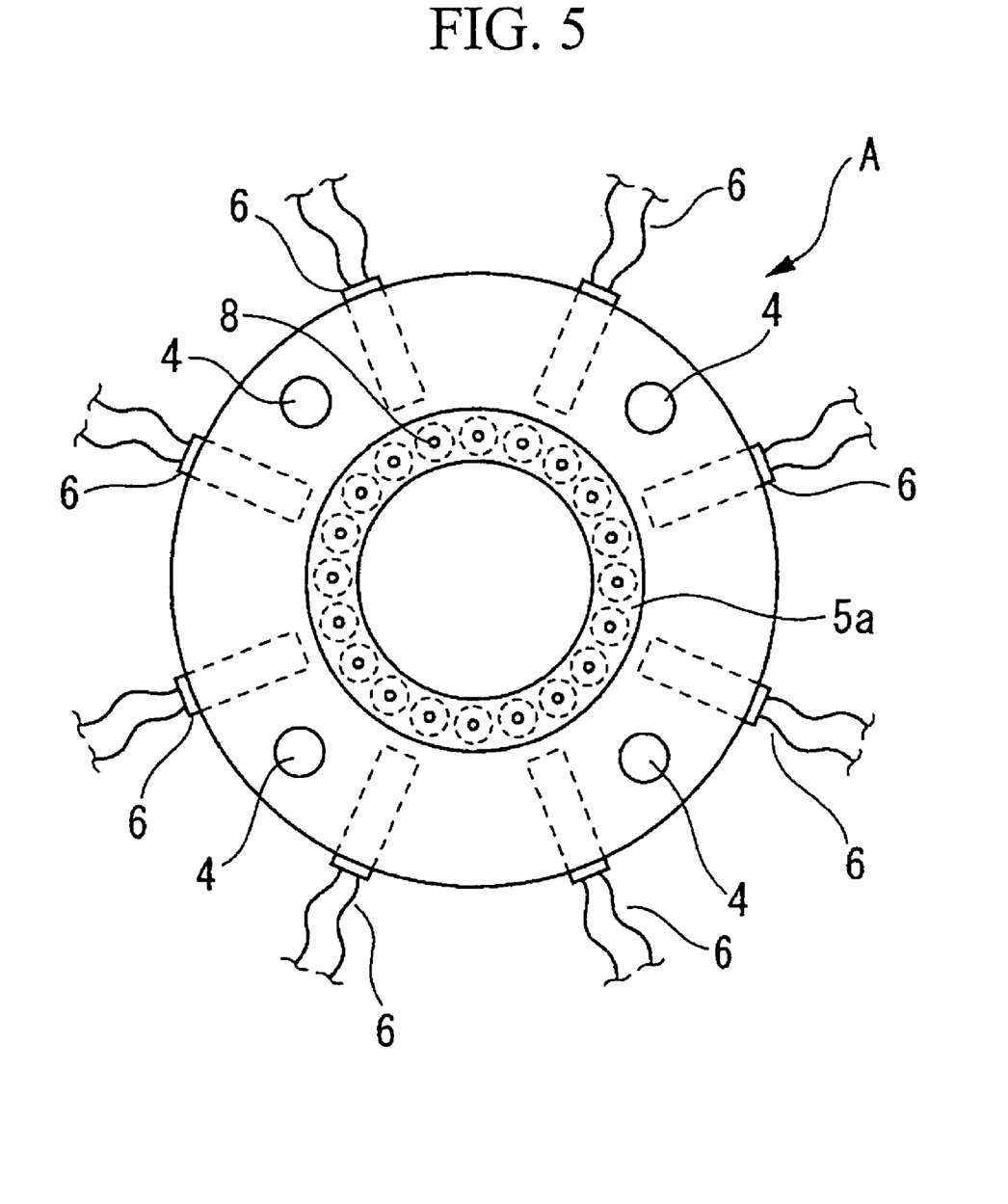
FIG. 5 is a sectional perspective view of this granulating die taken in a plane shown by the arrows I-I in FIG. 4.
Figure 6:
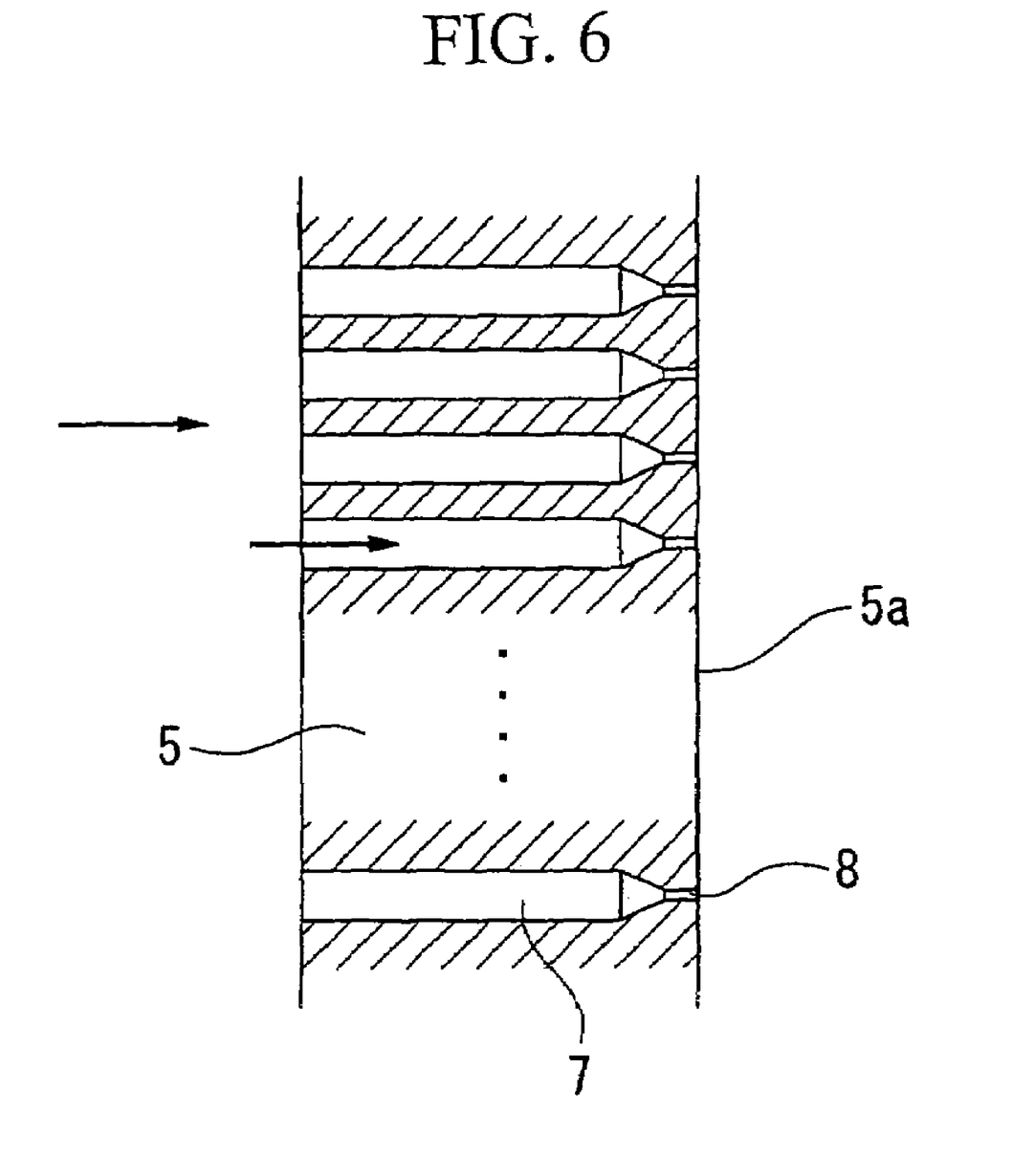
FIG. 6 is an exploded view of a tubular flow conduit portion of the granulating die.

FIGS. 4 to 6 are figures showing an example of a granulating die which is used in a prior art type hot cut method; FIG. 4 is a sectional view of a granulating die A which has been fitted to the end of an extruder not shown in the figures and of a portion of a chamber 12 (a cutter chamber), FIG. 5 is a sectional view thereof taken along the line I-I in FIG. 4, and FIG. 6 is an exploded view of a tubular flow conduit portion, showing the arrangement of the tubular flow conduit.

This die A for granulation has a die holder 1 which is fixed to the tip of the extruder, and a die body 5 which is fixed to the end of this die holder 1. The interior of this die holder 1, which is formed in a tubular shape, is connected to the end of the extruder, thus constituting a melted resin flow conduit 2. Furthermore, the reference symbol 3 denotes a heater for the die holder portion, while 4 denotes bolts which attach the die main body 5. Within the die main body 5 there are provided a plurality of tubular flow conduits 7 which, with connecting to the melted resin flow conduit 2, also connect to a plurality of nozzles 8 which open to a resin discharge surface 5a formed of the die main body 5, with the nozzles 8 being provided around a circle defined upon the resin discharge surface 5a. A plurality of rod shaped heaters 6 are inserted into the die main body 5. With this granulating die A, resin passes from the end of the extruder along the melted resin flow conduit 2 and the tubular flow conduits 7, and is extruded from the plurality of nozzles 8 which are provided upon the resin discharge surface 5a. With this prior art type granulating die A, as shown in FIG. 6, the nozzles 8 and the tubular flow conduits 7 are provided at equal intervals along the circle which is defined upon the resin discharge surface 5a.

The chamber 12 which is communicated to the resin discharge surface 5a of this granulating die A houses a cutter which has a cutter rotation shaft 9, a cutter blade support member 10, and a blade for cutting 11, and is provided with a process water inlet 13 and a process water outlet 14. In this chamber 12, while the cutter is being rotationally driven within the flow of water, the resin which has been discharged from the resin discharge surface 5a is cut immediately in the flow of water, and the granules which have been obtained are carried out with the outflow of water through the process water outlet 14 from the chamber 12.

However, since in this hot cut method the resin discharge surface of the die is in contact with the flow of water, heat is taken out from the resin discharge surface into the flow of water, so that it may happen that the temperature of the interior of the die, at least locally, may drop below the melting point of the resin. As a result, there is a danger that the holes in the nozzles may clog up, so that the productivity of the device is seriously deteriorated. Moreover, even if such clogging does not occur, it may also happen that the diameters of one or more of the nozzles may become narrowed down, so that the diameter of the pellets or granules produced may become irregular, and in this case the quality of the product granules is seriously negatively affected. Even further, if a large amount of clogging takes place, along with it becoming impossible to extrude the resin from the die, the pressure upstream of the die may become abnormally high, and this may exert a negative influence upon an upstream device, such as for example an extruder or the like.

In relation to a granulating die for use in granulation by the hot cut method there has heretofore been proposed a granulating die which has a rod shaped heater in the center of each of a plurality of flow conduits within the die and a plurality of nozzles which is provided corresponding to each of these flow conduits so as to heat up the nozzles uniformly (in, for example, Japanese Unexamined Patent Application, First Publication No. H07-178726) as a technique for preventing clogging of the nozzles.

Furthermore, a granulating die has been proposed (in, for example, Japanese Unexamined Patent Application, First Publication No. H11-58374) in which, in order to prevent dropping of the temperature in the interior of the granulating die, the vicinity in which the nozzles of the granulating die open is covered over with a porous metallic material which has a low thermal conductivity.

However, even if the above described prior art techniques are utilized in order to prevent clogging of the nozzles of the granulating die, the beneficial effect of preventing nozzle clogging has been insufficient. In particular, when pelletizing the expandable resin granules for manufacturing a foamed product by adding a blowing agent to the thermoplastic resin in the hot cut method, since the extruded resin should be formed in the water of which the temperature for manufacturing usual non-expandable resin granules (normally 60° C. to 80° C.), then it is necessary to set the temperature of the process water to a lower temperature than the normally temperature, so that as a result clogging of the nozzles may occur particularly easily, and accordingly problems arise in that the productivity is low, and the diameter of the granules which are produced becomes unstable.

As a result of assiduous investigations with regard to the problem of nozzle clogging with a granulating die to be used in the hot cut method, the present inventors have realized that there is a relationship between those of the nozzles which may easily become clogged and the direction of the flow of the water, and furthermore that, in order to prevent clogging of the nozzles, it is effective to replenish the heat energy which is lost by contact with the water by flowing a heating medium within the die main body; and, based thereupon, the present inventors have conceived the present invention.

Thus, the present invention has been elaborated in the light of the above described problems, and it takes as its objective to provide a granulating die for the hot cut method, which is capable of producing granules of uniform diameter at good efficiency while preventing clogging of the nozzles.

DISCLOSURE OF INVENTION

The granulating die according to the present invention has a resin discharge surface which is provided in contact with a flow of water, and nozzles which are communicated with a cylinder of an extruder and which open to the resin discharge surface, and wherein none of the nozzles is provided in the resin discharge surface at least one of following positions, a position which is towards directions of inflow and outflow of water, and positions which are towards directions orthogonal to the direction of the inflow and outflow of the flow of water.

According to this granulating die, since there are no nozzles provided in at least one of the following positions on the resin discharge surface at which it is easy for clogging of nozzles to occur: towards the direction of inflow and outflow of the flow of water, and towards the direction of orthogonal to the direction of inflow and outflow of the flow of water, it is made difficult for clogging of the nozzles to occur. Accordingly, with this granulating die, deterioration of the production efficiency due to nozzle clogging is ameliorated, and it becomes possible to manufacture granules of a uniform diameter and of a high quality.

The nozzles may be arranged along a circumference of a circle defined upon the resin discharge surface.

In the granulating die, resin flow conduits which communicate between the cylinder and the nozzles may be formed in an interior of the die, and a heating medium flow conduit may be provided for heating a resin within the resin flow conduits. In this case, since the heating medium flow conduit which is connected to the nozzles and heats up the resin within the resin flow conduits, it becomes possible further to enhance the beneficial effect of prevention of clogging of the nozzles. Accordingly, with this granulating die, it is possible to prevent clogging of the nozzles and to manufacture granules of uniform diameter at high efficiency, even in the case of manufacture of expandable resin granules for which the temperature of the water must be set particularly low.

An inlet and an outlet of the heating medium flow conduit may both be provided at a vicinity of positions of the resin discharge surface in which none of the nozzles is provided.

The granulating die may have a structure in which none of nozzles is provided both at positions towards the direction of inflow and outflow of the flow of water and towards the direction of orthogonal to the direction of inflow and outflow of the flow of water. That is, the nozzles are neither provided at the position along the direction of inflow and outflow of the flow of water and the positions towards the direction of orthogonal to the direction of inflow and outflow of the flow of water. At the position along the direction of inflow and outflow of the flow of water, the nozzle clogging may most easily occur, and the position towards the direction of orthogonal to the direction of inflow and outflow of the flow of water is the next. Accordingly, it becomes possible to obtain the beneficial effect of prevention of clogging of the nozzles to a yet greater degree.

A granulation device according to the present invention has the granulating die; an extruder to the end of which the granulating die is attached; and a chamber which houses a cutter which cuts a resin which is discharged from the nozzles of the granulating die and wherein in the chamber a flow of water contacts with the resin discharge surface of the granulating die.

With this granulation device, resin flow conduits which communicate between the cylinder and the nozzles may be formed in an interior of the granulating die, and a heating medium flow conduit may be provided for heating a resin within the resin flow conduits.

And, with this granulation device, the inlet and the outlet of the heating medium flow conduit may be provided in the vicinity of positions of the resin discharge surface in which none of the nozzles is provided.

A method of manufacturing expandable thermoplastic resin granules according to the present invention has: supplying a thermoplastic resin to an extruder to which is attached a granulating die, and melting and mulling the resin; adding a blowing agent into the thermoplastic resin while moving the thermoplastic resin towards the granulating die so as to produce the blowing agent containing resin; and cutting the blowing agent containing resin which is discharged from the nozzles of the granulating die within a flow of water with a cutter.

According to this method, it becomes difficult for the nozzles to become clogged, since there are no nozzles provided in at least one of the following positions on the resin discharge surface at which it is easy for clogging of nozzles to occur: towards the direction of inflow and outflow of the flow of water, and towards the direction of orthogonal to the direction of inflow and outflow of the flow of water. Accordingly, deterioration of the production efficiency of the blowing agent containing resin due to nozzle clogging is ameliorated, and it becomes possible to manufacture granules of a blowing agent containing resin with a uniform diameter and of a high quality.

With this method, along with resin flow conduits which communicate between the cylinder and the nozzles, being formed in the interior of the granulating die, a heating medium may be flowed in the heating medium flow conduit so as to heat up the resin within the resin flow conduits.

Furthermore, with this method, the inlet and the outlet of the heating medium flow conduit may be provided in the vicinity of positions of the resin discharge surface in which none of the nozzles is provided.

BEST MODE FOR CARRYING OUT THE INVENTION

The present invention will now be described with reference to the drawings.

Figure 1:
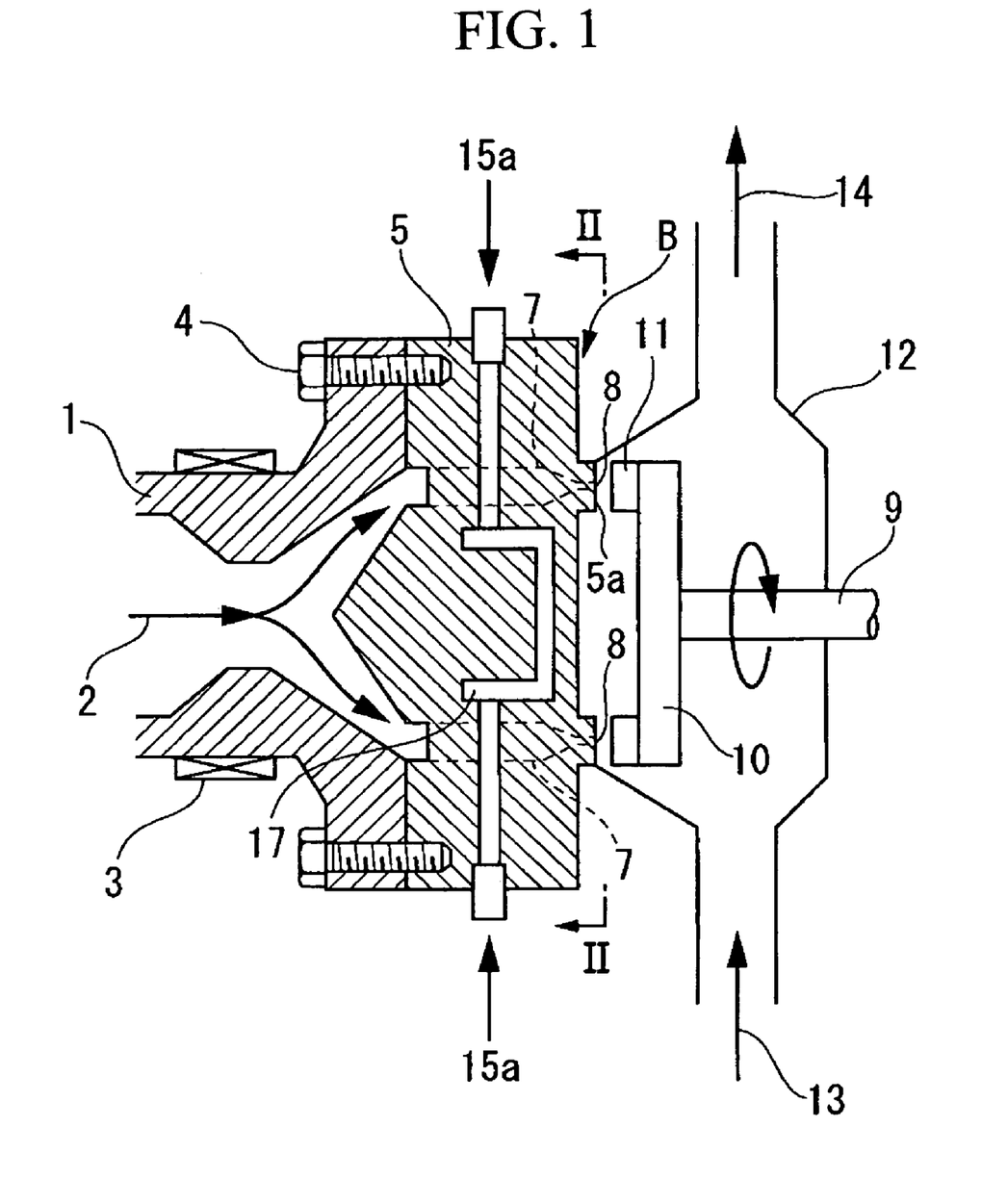
FIG. 1 is a sectional view showing an embodiment of the granulating die according to the present invention.
Figure 2:
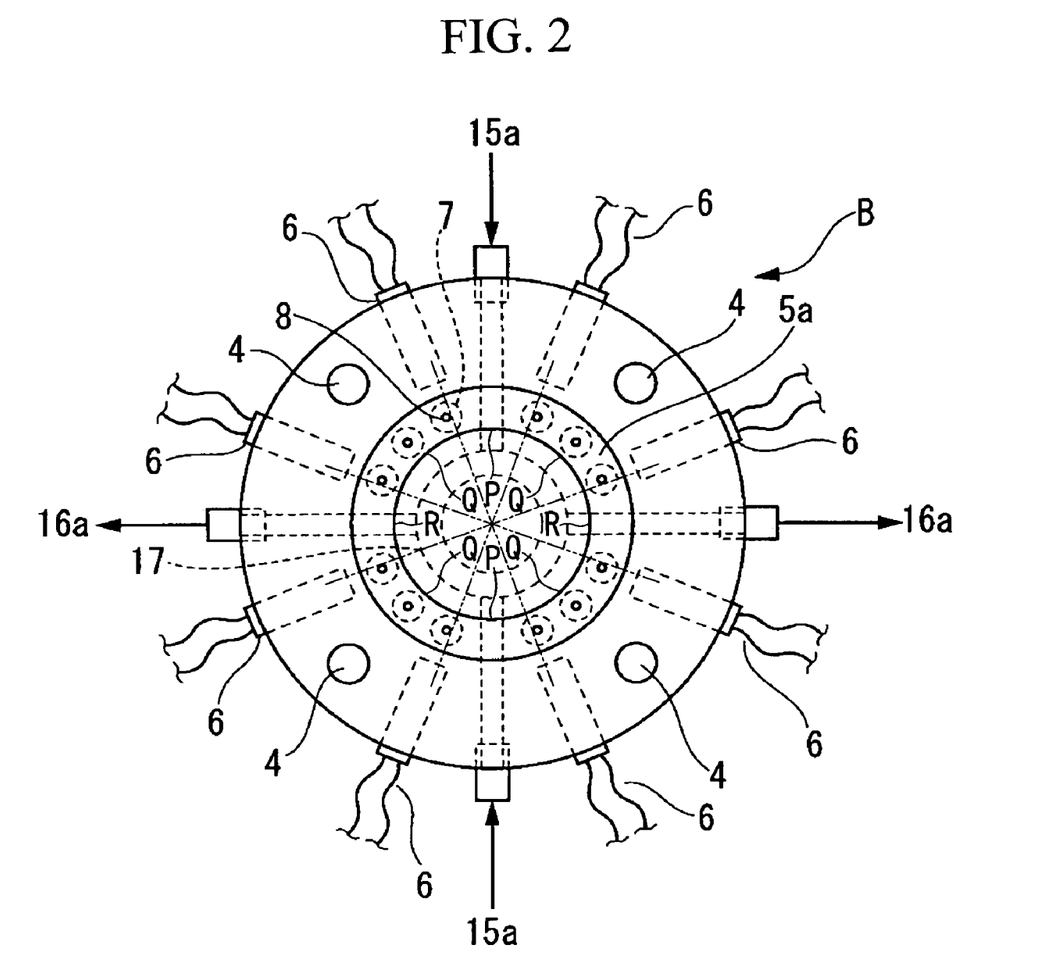
FIG. 2 is a sectional view taken along the II-II line in FIG. 1.
Figure 3:
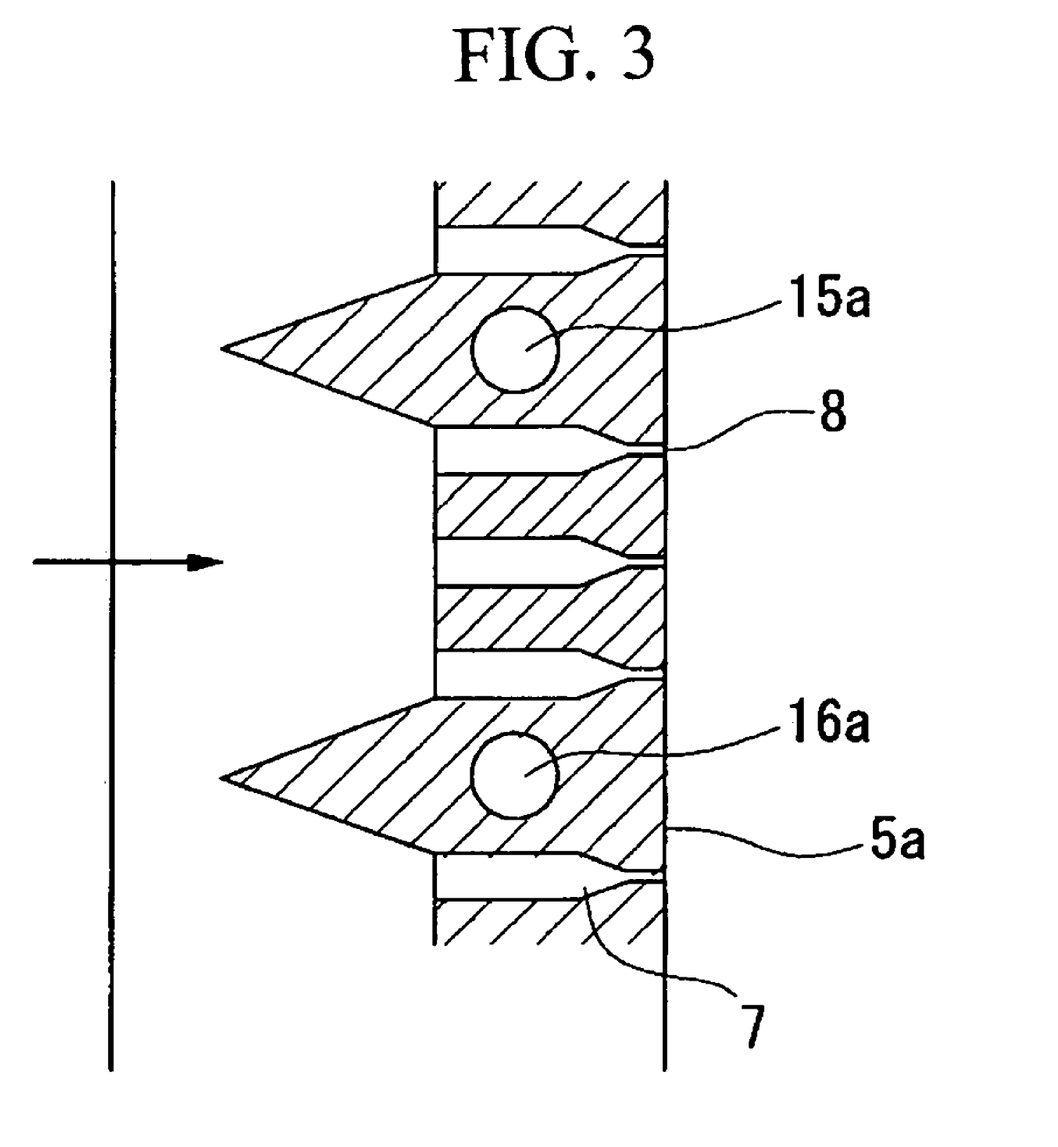
FIG. 3 is an exploded view showing a tubular flow conduit portion of the granulating die.

FIGS. 1 to 3 are figures showing a granulating die according to the present invention. A granulating die B according to the present invention is used in granulation by the hot cut method for manufacture of granules (pellets) by extruding thermoplastic resin which has been melted and mulled in an extruder from a nozzle into water, while simultaneously cutting the resin. FIG. 1 is a sectional view of the granulating die B, which is attached to the end of an extruder not shown in the figures, and of a portion of a chamber 12 (a cutter chamber); FIG. 2 is a sectional view taken along the line II-II in FIG. 1; and FIG. 3 is an exploded view of a tubular flow conduit portion, showing the arrangement of certain tubular flow conduits.

This granulating die B has a die holder 1 which is fixed to the end of the extruder (not shown), and a die main body 5 which is fixed to the end of this die holder 1. The interior of the die holder 1 formed in a tubular shape is a melted resin flow conduit 2 communicated to the end of the extruder. The reference symbol 3 denotes a die holder portion heater, while 4 denotes bolts for fitting the die main body 5. A plurality of rod shaped heaters 6 are inserted into the die main body 5. In this granulating die B, resin is discharged from the end of the extruder through the melted resin flow conduit 2 and tubular flow conduits 7, and is then extruded from a plurality of nozzles 8 which are provided upon a resin discharge surface 5a. In the example shown in the figures, a nozzle 8 is a single aperture formed with each of the tubular flow conduits 7; but the configuration of the apertures of the nozzle 8 may be formed with a plurality of holes like a cross sectional shape of rhizome.

In the chamber 12 which is provided so as to connect the resin discharge surface 5a of this granulating die B, a cutter which has a cutter rotation shaft 9, a cutter blade support member 10, and cutting blades 11 is housed, and a process water inlet 13 and a process water outlet 14 is provided. In this chamber 12, the cutter is rotationally driven within the flow of process water and cuts the resin which is discharged from the resin discharge surface 5a directly in the flow of water, so that the granules which are obtained are carried out along with the flow of through the process water outlet 14.

Within the die main body 5 there are provided a plurality of tubular flow conduits 7 which, being connected to the melted resin flow conduit 2, also connected to a plurality of nozzles 8 which open to the resin discharge surface 5a of the die main body 5, and these tubular flow conduits 7 are arranged around a circumference of a circle on the resin discharge surface 5a; but none of nozzles 8 or tubular flow conduits 7 is provided at the positions P which towards the direction of inflow and outflow of the flow of water, and at the positions R which are orthogonal to the region P. The nozzles 8 are only provided in the regions Q other than at these positions P and R. To explain this with reference to the example shown in FIG. 2, the resin discharge surface 5a of this die main body 5 is shaped like a circular ring, and the nozzles 8 are provided in the regions Q except in the regions P and Q which are located vertically and horizontally around the center of this ring shape as seen in the figure, along a virtual circular path which is concentric with the resin discharge surface 5a but whose diameter is smaller than the outer diameter of the resin discharge surface 5a.

The lower portion in the figure of the resin discharge surface 5a is corresponds the direction of the process water inlet 13, while the upper portion of the resin discharge surface 5a is corresponds the direction of the process water outlet 14; and, furthermore, the portions of the resin discharge surface 5a to the left and the right in FIG. 2 are corresponds the directions which are orthogonal to the directions of the process water inlet 13 and the process water outlet 14.

Specifically, in this embodiment, none of nozzles 8 is formed at the regions P which, referred to the center of the resin discharge surface 5a, are defined by center angles of from 10 to 50° around the process water inlet 13 and the process water outlet 14, or in the regions R which are defined by center angles of from 10 to 50° around the region which is orthogonal to the direction from the process water inlet 13 to the process water outlet 14, so that the nozzles 8 are only formed in the regions Q upon the resin discharge surface 5a which are outside the regions P and the regions R. It should be understood that, in this embodiment, the nozzles 8 are arranged over each region Q as being spaced apart by a fixed interval.

If these center angles are less than 10°, then there is a fear that clogging of the nozzles may easily occur; while, on the other hand, if these center angles are greater than 50°, then there is a fear that the regions for formation of the nozzles may be restricted, so that the productivity is deteriorated. The center angles of the regions P and R are more desirably in a range of 10° to 30°, and even more desirably in a range of 15° to 25°.

With regard to these regions upon the resin discharge surface 5a in which none of nozzles 8 is provided, in the regions P, which adjoin the process water inlet 13 and the process water outlet 14, it would be particularly easy for clogging of the nozzles to occur. If any were provided there; so that, by employing this structure in which none of such nozzles 8 or tubular flow conduits 7 is provided in these two regions P, the beneficial effect is obtained that, to this extent, clogging of the nozzles is prevented.

Moreover, in this embodiment, a structure is employed in which, furthermore, none of nozzles 8 and tubular flow conduits 7 is provided in the two regions R which lie in the regions upon the resin discharge surface 5a orthogonal to the directions of the flow of the process water. It has been determined that the horizontally regions upon the resin discharge surface 5a are easy to occur clogging of the nozzles next the vertically regions upon the resin discharge surface 5a, which is the region along the process water inlet 13 and the process water outlet 14. Accordingly, by not providing any nozzles 8 and tubular flow conduits 7 moreover in these regions R towards the left and right sides of the resin discharge surface 5a, the beneficial effect is obtained that it is possible further satisfactorily to prevent clogging of the nozzles.

Furthermore, in this embodiment, a heating medium flow conduit 17 for heat the resin in the tubular conduit 7 which is connected to the nozzle 8 is provided in the interior of the die main body 5. The suitable heating medium for flowing in this heating medium flow conduit 17 is selected appropriately according to the heating temperature; for example, if a heating medium at about 200° C. is required, synthetic oil or the like may be appropriately used. The temperature of this heating medium may be set to the temperature of heating the resin in the extruder, or set to the resin temperature within the melted resin flow conduit 2; or set different temperature respectively. Furthermore, the flow rate of this heating medium may be of an order which is capable of replenishing the heat energy which is lost due to the contact between the resin discharge surface 5a and the flow of water. It is preferable that the temperature and the flow rate of the heating medium being set so as to be increased or decreased according to the state of clogging of the nozzles 8. Moreover, it is preferable that the heating medium be supplied and circulated to the heating medium flow conduit 17 by a heating medium supply means not shown in the figures, and be heated up to a predetermined temperature before being supplied to the heating medium flow conduit 17.

Furthermore, in this embodiment, heating medium inlets 15a and heating medium outlets 16a are provided in the vicinity of the regions P of the resin discharge surface 5a in which none of nozzles 8 is provided. In the example shown in FIG. 2, the heating medium inlets 15a which lead to the heating medium flow conduit 17 provided within the die main body 5 are provided in the regions P at the upper side and at the lower side of the resin discharge surface 5a, while the heating medium outlets 16a which also lead to the heating medium flow conduit 17 are provided in the regions R at the left side and at the right side of the resin discharge surface 5a. Since, by employing this type of structure, the heating medium which has been heated up to a predetermined temperature is supplied to the upper portion and to the lower portion of the resin discharge surface 5a, which are portions which particularly lose a lot of heat due to the flow of process water, accordingly it is possible to enhance the uniformity of the temperature distribution upon the resin discharge surface 5a.

This granulating die B, as shown in FIG. 1, is fitted to the end of the extruder via the die holder 1. Resin which has been melted and mulled within the extruder flows through the melted resin flow conduit 2 and into the tubular flow conduits 7. The ends of the tubular flow conduits 7 are narrowed down in diameter, and constitute nozzles 8 which open in the resin discharge surface 5a. The resin which is flowing within the die main body 5 is heated up by the die holder portion heater 3 and the rod shaped heaters 6, and thus is maintained in the molten state. And the resin which is discharged from the nozzles 8 comes into contact with the process water which is flowing within the chamber 12, and is cut within this process water flow by the cutting blades 11 of the cutter. The granules which have thus been cut assume a roughly spherical form, and are transported along with the process water out of the chamber 12 while being cooled, and subsequently is dehydrated and dried, thus becoming finished resin granules. The process water which has thus been separated from the granules is recirculated and is supplied back into the chamber 12.

In this granulation process by the hot cut method, the resin discharge surface 5a of the granulating die B may easily lose a lot of heat, because it comes into contact with the process water. In particular, the portions of the resin discharge surface 5a which are close to the process water inlet 13 and to the process water outlet 14 may easily suffer local temperature dropping. However since, with this granulating die B, none of the nozzles 8 is provided upon the resin discharge surface 5a in these regions which are close to the process water inlet 13 and to the process water outlet 14 at which local dropping of the temperature may easily occur, accordingly it is possible to prevent clogging of the nozzles 8 which are provided upon the other portions of the resin discharge surface 5a, and thereby it is possible to ameliorate deterioration of the production efficiency due to clogging, and it is possible to manufacture granules of uniform granule diameter and moreover of high quality.

Furthermore since, with this granulating die B, also none of the nozzles 8 is provided upon the resin discharge surface 5a in the regions along the direction which extends orthogonally to the process water inlet 13 and the process water outlet 14, which, next to the regions near the process water inlet 13 and the process water outlet 14, are the regions in which clogging may most easily occur, accordingly the beneficial effect of prevention of clogging of the nozzles is even more excellent.

Furthermore, with this granulation die B, by providing the interior of the die main body 5 the heating medium flow conduit 17 which heats up the resin in the resin flow conduits connecting to the nozzles 8, it is possible to further enhance the beneficial effect of preventing clogging of the nozzles 8. Accordingly, even during the manufacture of expandable resin granules for which it is necessary to set the temperature of the process water particularly low, it is possible to prevent clogging of the nozzles, and to produce granules of a uniform diameter at good efficiency.

It is possible to apply this granulating die B to various sorts of per se well known prior art granulation devices, typically having an extruder to the end of which a granulating die is fitted, and a chamber which, along with housing a cutter which cuts the resin which is discharged from the nozzles of the granulating die, also brings a flow of water into contact with the resin discharge surface of the granulating die. Yet further, a granulation device which has the above described granulating die may be provided. It is desirable that the extruder which constitutes this granulation device be selected appropriately according to the type of the resin which is to be granulated and so on, from among various types of extruder which are per se well known in the prior art in the resin forming field; for example, a single shaft extruder, a two-shaft extruder, a tandem type extruder or the like. Furthermore, for the chamber which is to house the cutter, it is possible to utilize a chamber of a type which is per se well known in the prior art, and is used in the hot cut method.

The type of thermoplastic resin which is to be used with the present invention is not to be considered as being particularly limited; however, for example, polystyrene type resin, polyethylene type resin, polypropylene type resin, polyester type resin, vinyl chloride type resin, ABS resin, AS resin or the like may be used, either individually or two or more in combination. Furthermore, it is possible to utilize recycled thermoplastic resin which has been obtained by recycling after having been used once in resin products. In particular, a polystyrene type resin, such as polystyrene (GPPS), high-impact polystyrene (HIPS), or the like, is appropriate for use in this context.

When expandable thermoplastic resin granules are to be manufactured using the granulation device, the thermoplastic resin is supplied to the extruder to the end of which is fixed the granulating die B, and this thermoplastic resin is melted and mulled. Next, a blowing agent is added into this thermoplastic resin while moving the thermoplastic resin towards the granulating die B, so as to process a blowing agent containing resin. Furthermore, while discharging this blowing agent containing resin from the nozzles 8 of the granulating die B, the resin is cut directly within the flow of water with the cutting blade 11 of the cutter. The chamber 12 is arranged so as to surround the resin discharge surface 5a of the granulating die B, and the cutter is disposed within this chamber 12.

In this method as well, it is desirable that the resin flow conduit 2 which connect the nozzles 8 be provided within the interior of the granulating die B and the heating medium flowing in the heating medium flow conduit 17 heat up the resin within the resin flow conduit 2.

Yet further, with this method as well, it is desirable for the inlet 15a and the outlet 16a of the heating medium flow conduit 17 to be provided in the vicinity of the regions P and R of the resin discharge surface 5a in which none of the nozzles 8 is provided.

The blowing agent is not to be considered as being particularly limited, it is possible to utilize, for example, normal pentane, isopentane, cyclopentane, cyclopentadiene or the like, either individually or two or more in combination. Furthermore, as the principal component of the above described pentane type compounds, it is possible to utilize an admixture of normal butane, iso-butane, propane, or the like. In particular, a pentane type compound may be preferably used.

By the expandable thermoplastic resin granules, there is meant resin granules which have been formed in granular form, desirable as small spheres, by including the blowing agent in the thermoplastic resin. It is possible to utilize these expandable thermoplastic resin granules in the manufacture of foamed resin molded products of any desired shape, by heating them in free space so as to subject them to pre-expanding, then feeding these pre-expanded granules into a mold cavity which has the desired shape, and, after having fused together these pre-expanded granules by steam heating, releasing the final product from the mold.

INDUSTRIAL APPLICABILITY

Since, according to the granulating die according to the present invention, a structure is employed in which none of the nozzles is provided in the resin discharge surface at least: the position which are towards the direction of inflow and outflow of water, and the positions which are towards the directions orthogonal to the direction of inflow and outflow of water, which are the directions in which clogging may most easily occur, therefore it becomes difficult for clogging of the nozzles to occur, so that it becomes possible to ameliorate deterioration of production efficiency due to nozzle clogging, while being able to manufacture granules which are of uniform granule diameter and moreover of high quality.

What is claimed is:

1. A granulating die comprising:
a resin discharge surface which is provided in contact with a flow of water, and;
nozzles which are communicated with a cylinder of an extruder and which open to said resin discharge surface,
wherein none of the nozzles are provided in regions of said resin discharge surface which is towards directions of inflow and outflow of said flow of water, and none of the nozzles are provided in regions of said resin discharge surface which are orthogonal to the directions of inflow and outflow of said flow of water,
wherein the regions of said resin discharge surface which are towards the directions of inflow and outflow of said flow of water are defined by center angles of from 10° to 50° in the resin discharge surface around a center line which is parallel to the direction of the flow of water from the process water inlet to the process water outlet, and wherein the regions of said resin discharge surface which are orthogonal to the directions of inflow and outflow of said flow of water are defined by center angles of from 10° to 50° in the resin discharge surface around a center line orthogonal to the direction of the flow of water from the process water inlet to the process water outlet.

2. A granulating die according to claim 1, wherein said nozzles are arranged along a circumference of a circle defined upon said resin discharge surface.

3. A granulating die according to claim 1 or claim 2 comprising:
resin flow conduits which communicate between said cylinder and said nozzles being formed in an interior of said die; and
a heating medium flow conduit which is provided for heating a resin within said resin flow conduits.

4. A granulating die according to claim 3, wherein an inlet and an outlet of said heating medium flow conduit are provided in a vicinity of positions of said resin discharge surface in which none of said nozzles is provided.

5. A granulation device comprising:
a granulating die according to claim 1 or claim 2;
an extruder to the end of which said granulating die is attached; and
a chamber which houses a cutter which cuts a resin which is discharged from said nozzles of said granulating die and a flow of water into contact with said resin discharge surface of said granulating die.

6. A granulation device according to claim 5, further comprising:
resin flow conduits which communicate between said cylinder and said nozzles being formed in an interior of said granulating die, and
a heating medium flow conduit for heating the resin within said resin flow conduits.

7. A granulation device according to claim 6, wherein an inlet and an outlet of said heating medium flow conduit are provided in a vicinity of positions of said resin discharge surface in which none of said nozzles is provided.

8. A method for manufacturing expandable thermoplastic resin granules, comprising:
supplying a thermoplastic resin to an extruder to which is attached a granulating die according to claim 1 or claim 2 and melting and mulling said resin;
adding a blowing agent into said thermoplastic resin while moving said thermoplastic resin towards said granulating die so as to produce blowing agent containing resin; and
cutting said blowing agent containing resin which is being discharged from the nozzles of said granulating die within a flow of water with a cutter.

9. A method for manufacturing expandable thermoplastic resin granules according to claim 8, wherein resin flow conduits which communicate between said cylinder and said nozzles is provided within said granulating die, and flowing a heating medium in the heating medium flow conduit and heating up the resin within said resin flow conduits.

10. A method for manufacturing expandable thermoplastic resin granules according to claim 9, wherein an inlet and an outlet of said heating medium flow conduit are provided in a vicinity of positions of said resin discharge surface in which none of said nozzles is provided.

* * * * *